US011633827B2

(12) United States Patent
Bernhardt et al.

(10) Patent No.: US 11,633,827 B2
(45) Date of Patent: Apr. 25, 2023

(54) DEVICE FOR PROCESSING OPTICAL WORKPIECES, PARTICULARLY SPECTACLE LENSES

(71) Applicant: Satisloh AG, Baar (CH)

(72) Inventors: Viktor Bernhardt, Braunfels (DE); Frank Hanisch, Hüttenberg (DE); Torsten Mokrow, Heuchelheim (DE); Stephanie Pavel, Hüttenberg (DE)

(73) Assignee: Satisloh AG, Baar (CH)

( * ) Notice: Subject to any disclaimer, the term of this patent is extended or adjusted under 35 U.S.C. 154(b) by 1063 days.

(21) Appl. No.: 16/182,797

(22) Filed: Nov. 7, 2018

(65) Prior Publication Data
US 2019/0134770 A1 May 9, 2019

(30) Foreign Application Priority Data

Nov. 8, 2017 (DE) .......................... 102017010322.4

(51) Int. Cl.
B24B 13/00 (2006.01)
B24B 13/06 (2006.01)
(Continued)

(52) U.S. Cl.
CPC ...... *B24B 13/0037* (2013.01); *B23Q 17/0909* (2013.01); *B23Q 17/2457* (2013.01);
(Continued)

(58) Field of Classification Search
CPC ..... B24B 13/0037; B24B 13/06; B24B 49/12; B24B 49/00; B23Q 17/0909; B23Q 17/2457; B23Q 11/08
(Continued)

(56) References Cited

U.S. PATENT DOCUMENTS 8,448,343 B2 5/2013 Nakako
9,089,944 B2 7/2015 Schneider
(Continued)

FOREIGN PATENT DOCUMENTS

CN 205520644 U 8/2016
DE 202015007074 U1 12/2015
(Continued)

OTHER PUBLICATIONS

German Office Action; Applicant: Satisloh AG; Application No. 102017010322.4; dated Sep. 5, 2018; 5 pages.
(Continued)

*Primary Examiner* — Orlando E Aviles
*Assistant Examiner* — J Stephen Taylor
(74) *Attorney, Agent, or Firm* — Reising Ethington P.C.

(57) ABSTRACT

A device for processing spectacle lenses has a work chamber, which is accessible by way of an opening and in which a workpiece mount and at least one tool mount are opposite one another and movable relative to one another so that a processing region of a tool held at the tool mount can be brought into processing engagement with a workpiece held at the workpiece mount and in processing engagement can be guided over the workpiece. For recognition of wear at the tool, a sensor equipment with at least one contactlessly operating sensor arrangement is provided and is movable outside the work chamber between a protected rest position and a detecting position. In the detecting position the sensor equipment is constructed to detect at the processing region of the tool held at the tool mount an unacceptable deviation beyond a predetermined amount from a desired geometry.

19 Claims, 9 Drawing Sheets

(51) Int. Cl.
   *B23Q 17/09*   (2006.01)
   *B23Q 17/24*   (2006.01)
   *B23Q 11/08*   (2006.01)
   *B24B 49/12*   (2006.01)

(52) U.S. Cl.
   CPC .............. *B24B 13/06* (2013.01); *B24B 49/12* (2013.01); *B23Q 11/08* (2013.01)

(58) Field of Classification Search
   USPC ............................................................ 451/6
   See application file for complete search history.

(56) References Cited

U.S. PATENT DOCUMENTS

| | | | |
|---|---|---|---|
| 9,321,145 | B2 | 4/2016 | Wallendorf et al. |
| 10,583,540 | B2 | 3/2020 | Wallendorf et al. |
| 2007/0155287 | A1* | 7/2007 | Drain ...................... B24B 41/04 451/11 |
| 2007/0293128 | A1* | 12/2007 | Schafer ............... B24B 13/0037 451/7 |
| 2015/0038061 | A1* | 2/2015 | Wallendorf ............. B24B 47/22 451/163 |
| 2017/0246720 | A1* | 8/2017 | Wallendorf ............... B24B 9/14 |
| 2017/0246729 | A1 | 8/2017 | Phillipps et al. |
| 2019/0126432 | A1 | 5/2019 | Wallendorf et al. |

FOREIGN PATENT DOCUMENTS

| | | | |
|---|---|---|---|
| DE | 102016004328 | A1 | 10/2017 |
| DE | 102017003014 | A1 | 10/2018 |
| EP | 1477274 | A2 | 11/2004 |
| EP | 2363238 | A2 | 9/2011 |
| JP | 2014163807 | A * | 9/2014 ......... B23Q 17/2457 |

OTHER PUBLICATIONS

Extended European Search Report; Applicant: Satisloh AG; Application No. 18000864.1; dated Apr. 19, 2019; 5 pages.
Chinese Office Action, CN Application No. 201811342970.4, Applicant: Satisloh AG, Title: Device for Processing Optical Workpieces, Particularly Spectacle Lenses, dated Nov. 26, 2020 with English Translation.

* cited by examiner

DEVICE FOR PROCESSING OPTICAL WORKPIECES, PARTICULARLY SPECTACLE LENSES

TECHNICAL FIELD

The present invention relates generally to a device for processing optical workpieces. In particular, the invention relates to a device for precision processing of optically effective surfaces of spectacle lenses as widely used in so-called "RX workshops", i.e. production shops for producing individual spectacle lenses according to prescription, or in the production of conventional spectacle lenses such as, for example, lenses for sunglasses.

PRIOR ART

The processing of optically effective surfaces of spectacle lenses by material removal can be roughly divided into two processing phases, specifically firstly the preliminary processing of the optically effective surfaces for generating the macrogeometry according to prescription and then precision processing of the optically effective surfaces so as to eliminate preliminary processing tracks and obtain the desired microgeometry. Whereas preliminary processing of the optically effective surfaces of spectacle lenses is carried out, inter alia, in dependence on the material of the spectacle lenses by grinding, milling and/or turning, in precision processing the optically effective surfaces of spectacle lenses are usually subjected to a precision-grinding, lapping and/or polishing process, for which purpose use is made of an appropriate machine. To that extent, in the terminology of the present application the term "polishing"—also in word combinations such as, for example, "polishing tool" or the like—shall embrace precision-grinding and lapping processes, thus, in the example, precision-grinding or lapping tools.

A polishing machine with at least one device for precision processing of optically effective surfaces at, in particular, spectacle lenses as workpieces is known from, for example, document U.S. Publication No. 2017/0246720. This comprises a workpiece spindle which projects into a work chamber and by way of which a workpiece to be polished can be driven for rotation about an axis C of workpiece rotation. In addition, two tool spindles, at each of which a respective polishing tool can be driven for rotation about an axis A or A' of tool rotation and is held to be axially adjustable along the tool rotational axis A or A' (adjusting axes Z, Z'), projecting into the work chamber in association with and opposite to the workpiece spindles are provided. The tool spindles can in addition be moved together relative to the workpiece spindle along a linear axis X extending substantially perpendicularly to the workpiece rotational axis C and pivoted about different pivot setting axes B, B', which extend substantially perpendicularly to the workpiece rotational axis C and substantially perpendicularly to the linear axis X. In this prior art, the tool spindles are arranged, in a particularly compact mode of construction, in series as seen in the direction of the linear axis X.

By virtue of the combination of axes (A, A', B, B', C, X, Z, Z') present in this prior art, conventional polishing processes can be performed (1) with so-called "tangential polishing kinematics" in which the polishing tools axially adjusted (Z, Z') together with the tool spindles are moved in oscillation transversely (X) over the respective spectacle lens at a preset, but fixed, pivot angle (B, B') of the tool spindles with a relatively small stroke and also (2) with polishing kinematics in which the adjusted (Z, Z') polishing tools during the oscillating transverse movement (X) thereof are at the same time continuously pivoted (B) so as to follow the surface curvature of the respective spectacle lens, in which case the spectacle lens and the polishing tools can be driven about the rotational axes (A, A', C) thereof in the same sense or opposite sense at the same or different rotational speeds.

Moreover, the previously known device allows different, particularly automated, processing strategies, for example preliminary polishing and precision polishing with different polishing coverings or operation with differently sized (tool diameter) and/or differently curved (tool curvature radius) polishing tools so that the device is capable of multifarious uses without requiring longer processing times. In addition, re-equipping times are avoided if the device has several different tools and thus the tools do not have to be changed between the individual processing orders.

The flexible polishing tools—also called "polishing discs" due to their shape—used in this prior art have a substantially three-part or multi-layer construction, with (1) a comparatively firm or rigid support or base body which faces the tool spindle and to which (2) a layer, which is softer relative thereto, of a resilient material, for example a foam material layer, is secured, which (3) rests on a grinding or polishing foil (polishing medium carrier), which faces the workpiece, as processing-active tool component. As a consequence of the resilient deformability of the foam material layer the polishing foil can be adapted within certain limits in situ to the geometry of the surface to be processed. This is not only in a "static" respect, i.e. from spectacle lens to spectacle lens which are to be processed and which usually differ in the geometry thereof, particularly the surface curvature, but also in a "dynamic" respect, i.e. during the actual processing of a specific spectacle lens in which a relative movement takes place between the polishing disc and the spectacle lens. The resilience of the foam material layer additionally influences to a substantial degree the material removal behavior of the polishing disc during the polishing process.

During their intended use, polishing tools of that kind are subject to continuous wear which during processing is accentuated as a consequence of sharp edges at the spectacle lenses to be processed, pronounced cylinder curves, i.e. strong curvatures or curvature differences of the optically effective surfaces and/or due to small diameters of the spectacle lenses to be processed, since when moving over these "sharp edge zones" incisions can arise in the foam material layer of the flexible polishing tool and shearing effects occur which apart from increased wear can lead to formation of further incisions or fringing of the polishing tools. There is a risk that this damage to the polishing tools is not recognized in good time during the above-described polishing processes, which in a given case take place automatically. However, then further spectacle lenses are polished by damaged or even destroyed polishing tools, which ultimately causes increased wastage, i.e. insufficiently polished or damaged spectacle lenses.

One possibility for checking the wear state of such polishing tools includes visually comparing the tool surface, i.e. the polishing medium carrier, with comparison cards. However, such a procedure is costly, requires very good training of the operating personnel, is nevertheless subject to subjective fluctuations in the assessment and is difficult to incorporate into an automated process.

A further procedure for checking the wear state of, in particular, polishing tools is described in document U.S. Pat.

No. 9,089,944. According to this prior art, detection of the wear or the state of a polishing tool is carried out with, in particular, the assistance of an information carrier printed on the tool surface of the polishing tool, namely at least one barcode which is worn away during polishing and thus is partly or entirely removed or unreadable. The barcode is detected by a detecting device, particularly in the form of a camera, so that conclusions about the state of the polishing tool can be drawn directly by way of the readability of the barcode.

However, in that regard a problem is to be seen in the fact that the contrast, which is detectable by the camera, between the tool surface and the barcode is very small, because the polishing tools during use thereof are saturated or wetted with polishing medium. On the one hand this can have the consequence that faulty or worn tools are not securely recognized and accordingly continue to be used for polishing spectacle lenses. On the other hand, there is the possibility that polishing tools are prematurely exchanged because they have been "graded" as faulty although in fact they are still undamaged or unworn, thus still usable. To that extent, a possibility of wear recognition which gives more reliable information about the actual conditions would be desirable.

Finally, in earlier German Patent Application 10 2017 003 014.6, which is closest to the subject matter of the present application, of the same Applicant a device for precision processing of optically effective surfaces of workpieces is disclosed, which device has a work chamber in which a tool mount and at least one workpiece mount are opposite one another and movable relative to one another. In that case, a processing region of a polishing tool held at the tool mount to be drivable for rotation about an axis or rotation can be brought into processing engagement with a workpiece held at the workpiece mount and in processing engagement can be guided over the workpiece. Sensor equipment for wear recognition at the polishing tool is provided in the work chamber, the sensor equipment comprising a first sensor arrangement and a second sensor arrangement different therefrom. The sensor arrangements are positionable in the work chamber relative to the polishing tool so that the first sensor arrangement is oriented substantially normal to the processing region, while the second sensor arrangement is oriented substantially tangentially to the processing region. Whereas the first sensor arrangement of the sensor equipment preferably serves the purpose of detecting a luminescent substance, which is recognizable only from a predetermined amount of wear at the processing region of the polishing tool, the second sensor arrangement of the sensor equipment is preferably provided for the purpose of detecting, at the processing region of the polishing tool, an impermissible departure of the processing region from a desired geometry. As a result, different states of wear at the polishing tools can be reliably recognized without this causing a significant extension of process times.

What is desired is a device, which is constructed as simply and compactly as possible, for processing optical workpieces, particularly spectacle lenses, with an integrated sensor equipment for wear recognition at the tools used, in which wear states at the tools can be recognized as reliably as possible without this causing any or a significant prolongation of processing times.

SUMMARY OF THE INVENTION

A device according to one aspect of the invention for processing optical workpieces, particularly spectacle lenses, has a work chamber which is accessible from outside by way of a selectably closable opening and in which a workpiece mount and at least one tool mount are opposite one another and are movable relative to one another, so that a processing region of a tool held at the tool mount can be brought into processing engagement with a workpiece held at the workpiece mount and in processing engagement can be guided over the workpiece, wherein, for recognition of wear at the tool, sensor equipment with at least one contactlessly operating sensor arrangement is provided, the sensor arrangement being movable outside the work chamber from a protected rest position to a detecting position and conversely, and wherein the sensor equipment in the detecting position of the sensor arrangement is adapted to detect, via the opened opening of the work chamber, at the processing region of the tool held at the tool mount an unacceptable deviation of the processing region from a desired geometry beyond a predetermined amount.

In the design of the device according to the invention it is possible by use of the sensor equipment to reliably ascertain whether the wear of the tool, which can be, for example, a grinding tool or a polishing tool, varies within the scope of permissible wear or has assumed a proportion in which further use of the tool is prohibited, since in that case, for example, there would be concern for damage of the workpiece. The increased reliability in the recognition of wear is at the outset based on, inter alia, the fact that for recognition of wear there is no reading or non-reading of data at the tool together with the detection difficulties connected therewith, such as is the case with the prior art outlined in the introduction, but comparison between an actual geometry, which is present, and a target geometry, which is desired, at the processing region of the tool which is held at the tool mount and which in the processing of a workpiece is geometry-defining. Only if in this comparison there is an impermissible i.e. unacceptable departure beyond a predetermined amount of the actual geometry from the desired geometry, which leads to concern for incorrect definition of geometry at the workpiece, are measures to be undertaken, for example, a change of the investigated tool.

In that case, the fact that at least one contactlessly operating sensor arrangement of the sensor equipment is quasi doubly protected is particularly conducive to a high degree of reliability in the recognition of wear: on the one hand, the sensor arrangement is located outside the work chamber, from where the recognition of wear takes place via the opened opening of the work chamber. Accordingly, the sensor arrangement is never directly exposed to the contaminated work chamber environment, which in the case of, for example, a polishing device is characterized during processing by the spray mist of the abrasive, liquid polishing medium which is used and which settles in thick layers in the work chamber. Consequently, no polishing medium deposits or the like, which detract from detection accuracy, can form on the sensor arrangement. On the other hand, the sensor arrangement is also particularly protected outside the work chamber from such or similar influences as well as mechanical damage in that it is movable from its detecting position, in which it is opposite the opening of the work chamber, to a protected rest position and conversely. In addition, contamination through, for example, dripping polishing medium during tool or workpiece change can be reliably avoided.

Moreover, the wear recognition performable by the sensor equipment according to the invention does not cause any or a significant extension of processing times. Advantageously, wear recognition can be conducted by the process management in parallel with the loading and unloading processes taking place at the device in any case. The actual inspection of the respective tool can then be carried out, for example, prior or subsequently to a workpiece change. If a plurality of tool mounts with tools is present, the check for wear can embrace all tools present in the work chamber or, however, only the last-used tool if the other tool or tools might not have been in use.

Not least, the sensor equipment according to one aspect of the invention also does not demand any installation space in the work chamber of the device, which assists compact construction of the device.

As far as the principle of detection of the at least one sensor arrangement of the sensor equipment is concerned, obviously different principles of detection for an actual/desired comparison of tool geometries or contours are conceivable. However, with respect to low outlay and low susceptibility to error an approach is preferred in which the at least one sensor arrangement or each of the sensor arrangements comprises a laser and a light-section sensor, in which case a laser line able to be imaged by the laser on the processing region of the associated tool is detectable by the light-section sensor by way of a triangulation method. Such a procedure is advantageously independent of ambient light. Appropriate sensor arrangements are readily available commercially.

In principle, the movement between rest position and detecting position of the at least one sensor arrangement can be carried out by a pivot or rotational movement or by a stroke/rotational movement. However, with a view to a compact and simple construction it is preferred if the at least one sensor arrangement is mounted on a sensor holder of the sensor equipment, the holder being linearly displaceable with respect to a base frame, which is mounted in fixed position, of the sensor equipment so as to move the sensor arrangement from the protected rest position to the detecting position and conversely.

In that case, the sensor holder is preferably guided relative to the base frame by a linear guide which comprises a guide carriage attached to the base frame and a guide rail mounted on the sensor holder. Such a design is advantageously stiff and resistant to twisting. The sensor arrangement can be moved to the detecting position with the assistance of such a guide with a particularly high degree of reproducibility.

In principle, it is conceivable to operate the sensor equipment manually so as to move the sensor arrangement or arrangements from the protected rest position to the detecting position and conversely. However, for automated production it is preferred if the sensor arrangement has a linear drive disposed in drive connection with the sensor holder. Fundamentally, a ball screw drive, a stepping motor with a rack, or a similar device can be used as linear drive. However, for preference the linear drive is a pneumatic cylinder which is mounted between the base frame and the sensor holder to be effective in terms of actuation. Such pneumatic cylinders are advantageously simple, fast, reliable and economic.

In addition, for preference a shock absorber which limits the linear displacement of the sensor holder relative to the base frame and thus defines the detecting position of the at least one sensor arrangement can be arranged between the base frame and the sensor holder. This measure is also conducive to a high level of reliability in recognition of wear; sharp shocks and vibrations which could, for example, lead to loosening of the sensor arrangement or arrangements are advantageously damped.

Moreover, the at least one sensor arrangement can, in the protected rest position, be covered by a cover of the sensor equipment so as to be sealed relative to the environment. Thus, for example, a roof section can move together with the sensor holder and protect the sensor equipment in the manner of a screen.

It is particularly advantageous if the cover of the sensor equipment comprises a flap which is mounted at an edge so that the flap is pivotable from a closed setting associated with the rest position of the at least one sensor arrangement into an open setting associated with the detecting position of the at least one sensor arrangement and conversely. Such a flap has a canopy-like function and thus protects the sensor arrangement or arrangements even in the moved-out state from the side or the front from spray and mechanical damage. In that regard, the flap in the closed setting thereof can preferably co-operate with a seal, which is mounted in fixed location and encircles the sensor equipment, in order to seal off the sensor equipment relative to the environment.

In principle, the flap can have an individual drive for pivoting open or for closing. However, with respect to a simple design and a high degree of functional reliability it is preferred if the flap is pivotable relative to the base frame as a function of displacement of the sensor holder. In that case, the sensor holder can engage the flap in a particularly low-friction and low-wear manner by way of a rotatably mounted roller body. In a design which is more favorable in terms of energy and more compact the flap can in addition be spring-biased into the closed setting, for example by way of two tension springs engaging the flap.

Further, the flap can co-operate with a proximity switch which is mounted in fixed position and which is adapted to detect the closed setting of the flap and thus the rest position of the at least one sensor arrangement. Such an indirect detection of the protected rest position of the sensor arrangement or arrangements is more reliable than detection at the sensor holder, because the state of the flap staying open can be excluded.

If, in a preferred embodiment, the sensor equipment is mounted by way of a holding frame directly on a supporting frame, which surrounds the work chamber, of the device, then through this direct coupling there is advantageously a fixed relationship of the wear sensor system to the device components, in particular the tool spindles and tools.

In further pursuance of the concept of the invention there can be provided a further tool mount which is opposite the workpiece mount and which is movable in the work chamber relative to the workpiece mount so that a processing region of a further tool held at the further tool mount can be brought into processing engagement with a workpiece held at the workpiece mount and in processing engagement can be guided over the workpiece, wherein the further tool mount together with the further tool held thereat is movable in parallel arrangement to and together with the first-mentioned tool mount with respect to the sensor equipment into a checking position in which by means of the sensor equipment the wear recognition can be carried out via the opened opening of the work chamber by means of the sensor equipment, and wherein the sensor equipment comprises two sensor arrangements each associated with a respective tool mount. Thus, for example, simultaneous checking of the tools is advantageously possible. In that case, for preference the two sensor arrangements are of identical construction, which is of advantage with respect to low acquisition costs and the evaluating method, which can be of identical or similar configuration.

Finally, the sensor holder of the sensor equipment can have at a holder head two mounting surfaces each for a respective one of the sensor arrangements, which surfaces in wedge-shaped arrangement include an acute angle with one another, have a transverse offset relative to one another with respect to a longitudinal axis of the sensor holder and are provided with oblong holes which allow mounting of the sensor arrangements rotated relative to one another on the mounting surfaces. Such an embodiment of the sensor holder with mounted sensor arrangements is ultimately not only very compact, but in addition allows reliable sensing of the tools even through rather "small" openings to the work chamber.

BRIEF DESCRIPTION OF THE DRAWINGS

The invention is explained in more detail in the following on the basis of a preferred embodiment with reference to the accompanying, partly simplified or schematic drawings, which are not true to scale and in which.

Figure 1:
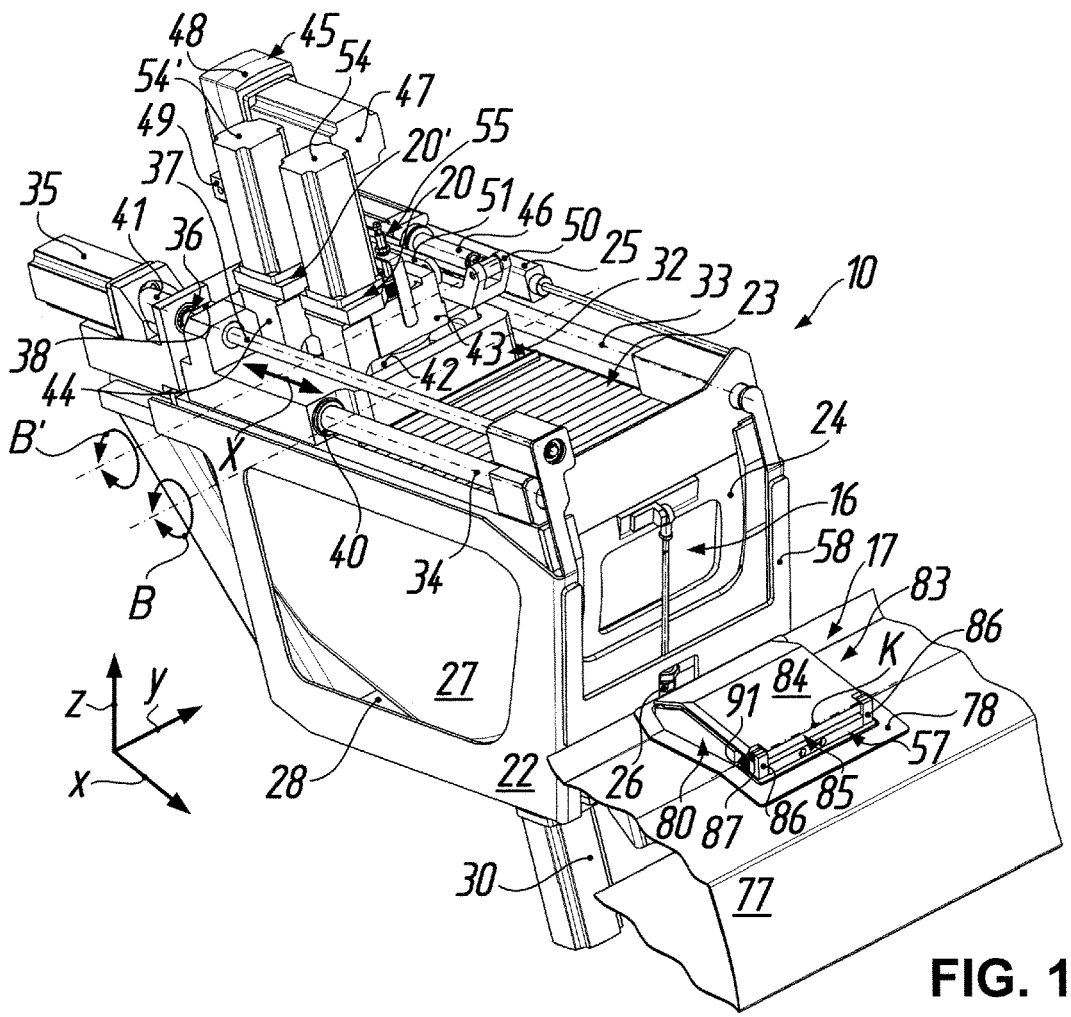
FIG. 1 shows a perspective view obliquely from above and front left of a device according to one embodiment of the invention for processing—by polishing—spectacle lenses, with a tool carriage (linear axis X) for two tool spindles, which are disposed in a retracted setting, wherein a work chamber bounded downwardly by a trough is closed upwardly by a bellows-like work chamber cover and forwardly by a sliding door, in front of which is seated outside the work chamber, in a sheet-metal cladding illustrated broken-away on both sides, sensor equipment for recognition of tool wear, the sensor equipment being disposed in a closed rest state.

With respect to the drawings it is also to be noted at this point that the device according to the illustrated embodiment of the invention forms a polishing cell, in a given case one of several polishing cells, of a polishing machine for spectacle lenses, wherein the device is, however, illustrated in the drawings separately from the polishing machine. The illustration in that case is in a right-angled Cartesian co-ordinate system in which the letter x denotes length direction, the letter y width direction and the letter z height direction of the polishing machine. As a consequence of the separate illustration, components of the polishing machine such as the operating unit and control, further stations (for example, spectacle lens washing station) and handling systems (for example conveyor belts for prescription boxes, portal handling system for transport of the spectacle lenses, etc.) are not shown. Moreover, in order to allow a view of essential components or subassemblies of the device and in order to simplify the illustration, for the most part components of the cladding, deposits for workpieces and tools, the supply equipment (inclusive of lines, hoses and pipes) for electric power, compressed air and polishing medium, the polishing medium return and the measuring, maintenance and safety devices, in particular, have also been omitted from the drawings, because they do not appear necessary for an understanding of the invention and are in any case familiar to the expert.

DETAILED DESCRIPTION OF THE EMBODIMENT

A device for processing optical workpieces, particularly spectacle lenses, is denoted by the reference numeral 10 in FIGS. 1 to 4. The device 10 can be mounted as a polishing cell optionally together with further devices of identical construction in a common machine frame (not shown) of a polishing machine, as known from document U.S. Publication No. 2017/0246720 (FIG. 1) already mentioned in the introduction. The device 10 has in general a work chamber 11 in which according to, in particular, FIGS. 2 to 4 a workpiece mount 12 on the one hand and at least one tool mount—in the present embodiment two tool mounts 13, 13'—on the other hand are opposite one another. The workpiece mount 12 and the tool mounts 13, 13' are movable relative to one another as will be described in more detail, so that selectably a processing region 14 of a polishing tool 15, which is held at the first tool mount 13 to be drivable for rotation about an axis A of rotation, or a processing region 14' of a further polishing tool 15', which is held at the further tool mount 13' to be drivable for rotation, can be brought into processing engagement with a workpiece (not shown) held at the workpiece mount 12 and, in processing engagement, can be guided over the workpiece.

Outside the work chamber 11, more precisely in front of a selectably closable opening 16 by way of which the work chamber 11 is accessible from the outside, sensor equipment 17 for recognition of wear of the polishing tools 15, 15' is provided, the sensor equipment in the illustrated embodiment comprising, in correspondence with the number of polishing tools 15, 15', two contactlessly operating sensor arrangements 18, 18'. The first tool mount 13 with the polishing tool 15 held thereat and the further tool mount 13' with the further polishing tool 15' held thereat are movable in parallel arrangement with respect to the sensor equipment 17 into a position which is shown in FIGS. 3 and 4 and in which recognition of wear at the polishing tools 15, 15' can be carried out by use of the sensor equipment 17. It is significant that, as will be similarly explained in more detail in the following, the sensor arrangements 18, 18' are movable outside the work chamber 11 from a protected rest position (FIGS. 1, 2, 6 to 8 and 10) into a detecting position (FIGS. 3 to 5, 9, 11 and 12) and conversely, wherein the sensor equipment 17 is adapted in the detecting position of the sensor arrangements 18, 18' to detect, via the opened opening 16 of the work chamber 11, at the processing regions 14, 14' of the polishing tools 15, 15' held in the work chamber 11 at the tool mounts 13, 13' an impermissible deviation of the respective processing region 14, 14' from a desired geometry by a predetermined amount.

Before the sensor equipment 17 is further described, initially the construction and functioning of the device 10, particularly the kinematics thereof, shall be explained in more detail on the basis of FIGS. 1 to 4: According to FIGS. 2 to 4, the device 10 comprises a workpiece spindle 19 which projects into the work chamber 11 and at the free end of which the workpiece mount 12 is mounted. A spectacle lens (not shown), which is to be polished and which is usually held by means of a blocking material on a blocking member for mounting in the workpiece mount 12, can be driven by way of the workpiece spindle 19 for rotation about a workpiece axis C of rotation. The workpiece mount 12 is in that case constructed as a clamping chuck which can be actuated by way of an actuating mechanism (not illustrated in more detail) in order to clamp the spectacle lens, which is blocked on the blocking member, to the workpiece spindle 19 to be axially fixed and capable of rotational entrainment.

In addition, the device 10 comprises two tool spindles 20, 20', which are associated with the workpiece spindle 19 and project oppositely into the work chamber 11 and at the free ends of which the tool mounts 13, 13' are respectively mounted in sealed manner by use of a bellows 21, 21'. The polishing tool 15, 15' held at the respective tool mount 13, 13' is drivable by way of the tool spindles 20, 20' for rotation about a tool rotational axis A, A' and axially adjustable along the tool rotational axis A, A' (adjustment axes Z, Z'), as indicated in FIGS. 2 to 4.

The tool spindles 20, 20' are, in addition, movable in common relative to the workpiece spindle 19 along a linear axis X extending substantially perpendicularly to the workpiece rotational axis C and pivotable about different pivot setting axes B, B', which extend substantially perpendicularly to the workpiece rotational axis C and substantially perpendicularly to the linear axis X. In that case, the tool spindles 20, 20' as seen in the direction of the linear axis X are arranged one behind the other, as can be best seen in FIGS. 1 and 3.

Figure 2:
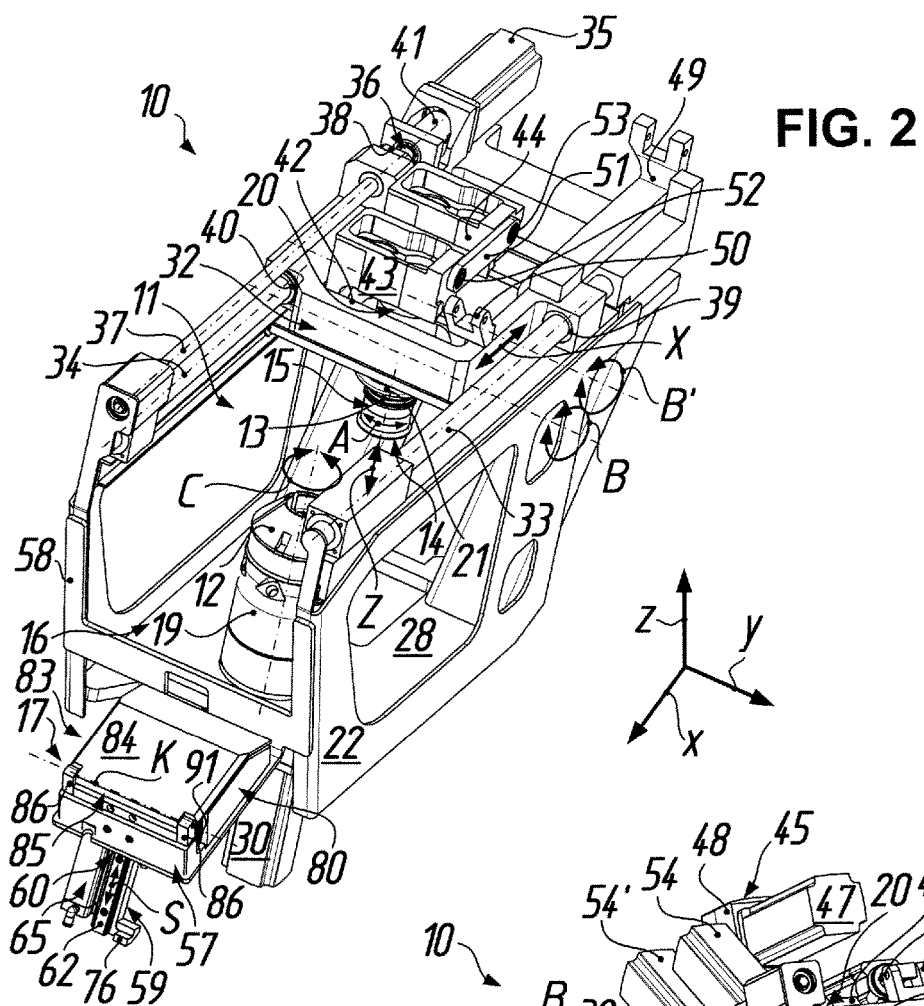
FIG. 2 shows a perspective view of the device according to FIG. 1 obliquely from above and front right, in which by comparison with the illustration in FIG. 1 apart from the sheet-metal cladding in the region of the sensor equipment the parts bounding the work chamber (trough, sliding door, bellows-like work chamber coverings), drives of the tool spindles and a linear drive for pivotation thereof have been omitted, particularly for illustration of pivot yokes (pivot setting axes B, B') for the tool spindles arranged one behind the other in the tool carriage (linear axis X)
Figure 3:
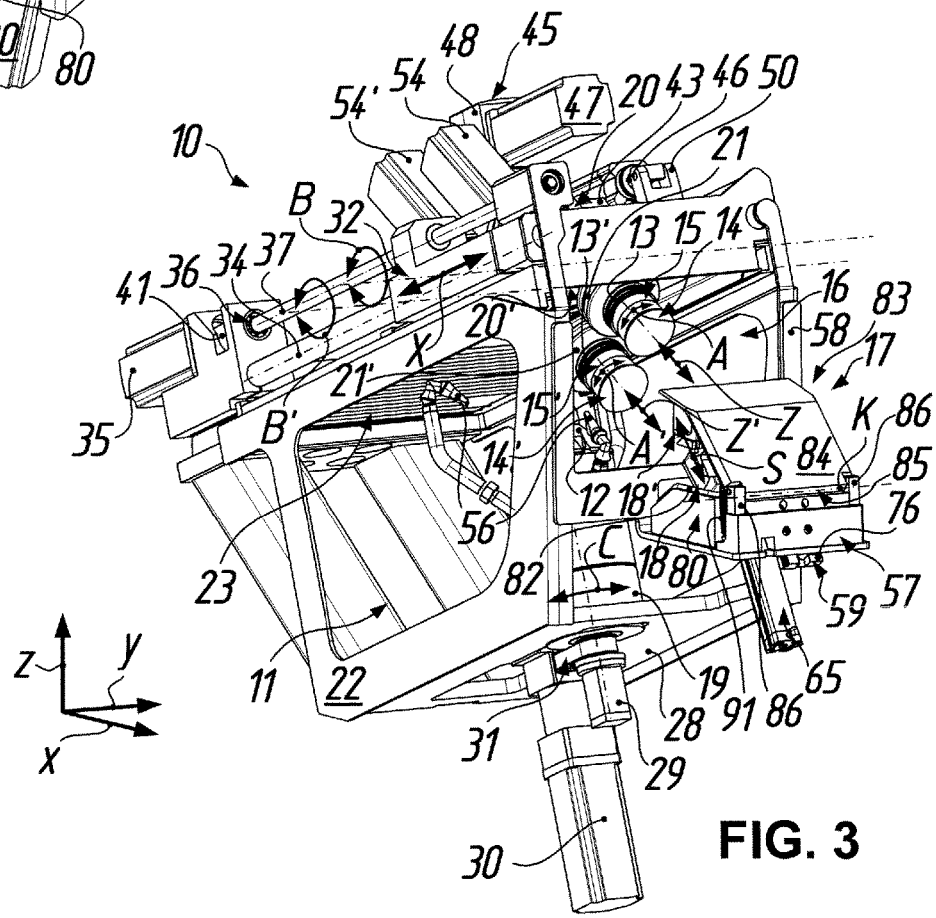
FIG. 3 shows a perspective view of the device according to FIG. 1 obliquely from below and front left, with illustration of all movement axes or possibilities of movement (tool rotational axes A, A'; pivot setting axes B, B'; workpiece rotational axis C; linear axis X; adjustment axes Z, Z') for a polishing process, without the trough and sliding door, wherein the tool spindles are pivoted forward about the pivot setting axes B, B' into the foremost setting of the tool carriage (linear axis X) so that polishing tools held at tool mounts of the tool spindles face the sensor equipment, which for recognition of wear at the polishing tools is disposed in an opened detecting state.
Figure 4:
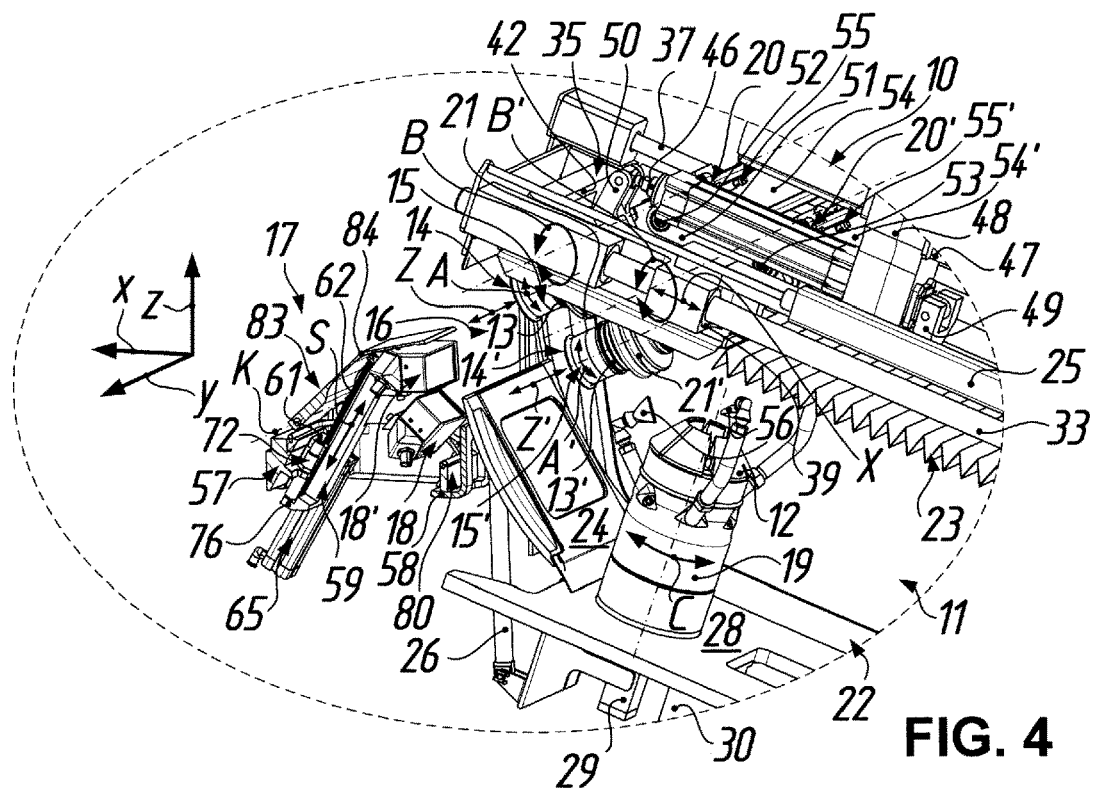
FIG. 4 shows a perspective view, which is broken away only in the region of the opened sensor equipment, of the device according to FIG. 1 obliquely from above and back right with a position of the movement axes (pivot setting axes B, B'; linear axis X; adjustment axes Z, Z') corresponding with FIG. 3, in which by comparison with the illustration in FIG. 3 a part of a frame, which surrounds the work chamber, of the device has been omitted and the sliding door for the work chamber is shown in an open setting, particularly so as to illustrate how sensor arrangements of the sensor equipment in the detecting state thereof outside the work chamber are opposite one another with respect to the polishing tools at the tool spindles in the work chamber referred to an opening, which is freed by the sliding door, to the work chamber.

According to, in particular, FIGS. 1 to 3 the work chamber 11 of the device 10 is surrounded by a frame 22, which supports the individual parts and subassemblies of the device 10 and which can be constructed as, for example, a welded construction of steel parts. The work chamber 11 can be covered at the top by a bellows-like work chamber cover 23 and is closable at the front in the region of the opening 16 by a sliding door 24 with a transparent window, as shown in FIGS. 1 and 4. In order to open the work chamber 11 for access from outside, the work chamber cover 23, which is suitably laterally guided, can be pushed or drawn back by a pneumatic cylinder 25 (omitted in FIG. 2). In addition, according to FIGS. 1 and 4, a pneumatic cylinder 26 (omitted in FIGS. 2 and 3) suitably articulated between the sliding door 24 and the frame 22 is provided for upward and downward movement of the sliding door 24, which is laterally guided, for closing (FIG. 1) or freeing (FIG. 4) the opening 16 to the work chamber 11. The work chamber 11 is bounded at the bottom by a trough 27 (shown only in FIG. 1), which is integrally deep-drawn from a plastics material and which is suitably fastened to the frame 22, with step-free wall surfaces, a drain opening at the deepest point and a sealed receiving opening for the workpiece spindle 19, through which the workpiece spindle 19 extends from below so as to project into a lower region of the work chamber 11.

As can be seen particularly in FIGS. 2 to 4, the frame 22 has a base plate 28 on which the workpiece spindle 19 is flange-mounted, from above, under the mounting opening in the trough 27. A pneumatic cylinder 29, fastened below the base plate 28, for the afore-mentioned actuating mechanism is illustrated in FIGS. 3 and 4 and opens or closes the tool mount 12, which is constructed as a clamping chuck, in a manner known per se. As can also be seen in FIGS. 1, 3 and 4, a rotary drive 30—in the illustrated embodiment a speed-controlled asynchronous three-phase motor—is flange-mounted on the base plate 28 from below. Similarly, below the base plate 28 the rotary drive 30 is in drive connection in FIG. 3 via a cogged-belt drive 31 with the roller-mounted spindle shaft of the workpiece spindle 19 so that the rotary drive 30 is capable of rotationally driving the workpiece spindle 19 at a predetermined rotational speed and in a predetermined rotational direction (workpiece axis C of rotation).

Provided above the workpiece spindle 19 for the movement of the tool spindles 20, 20' in common is a tool carriage 32 which is guided with respect to the frame 22 to be drivable along the linear axis X. More precisely, a rotary drive 35, which is mounted in fixed position at the frame 22 and which is in drive connection with a ball screw drive 36, is provided for moving and positioning the tool carriage 32, which is guided at two parallel guide rods 33, 34 connected with the frame 22 on opposite sides. The ball screw drive 36 comprises an axially fixed ball screw 37 which is rotatably mounted at both ends and which is disposed in engagement with a nut 38 connected with the tool carriage 32 to be secure against rotation relative thereto. In that case, the tool carriage 32 according to FIGS. 2 and 4 is guided at one guide rod 33 merely by way of an axial bearing 39 (ball bush), whereas it is guided at the other guide rod 34 by way of two axial bearings 40 (ball bushes), which are axially spaced from one another in the direction of the guide rod 34 and of which merely the front axial bearing 40 can be seen in FIGS. 1 and 2. The rotary drive 35 for moving the tool carriage 32 is a servomotor which is connected with the ball screw 37 by way of, for example, a metal bellows coupling 41. The thus-formed substantially horizontally extending linear axis X is CNC positionally regulated; however, for simplification of the illustration the associated travel measuring system is not shown.

As can be best seen in FIGS. 1 and 2, the tool carriage 32 is configured as a frame construction with an inner opening 42, which is substantially rectangular as seen in plan view, for reception of the two pivotable tool spindles 20, 20'. In that regard, one tool spindle 20, which is at the front, is mounted at or in a front pivot yoke 43 articulated to the tool carriage 32 to be pivotable with respect to both sides of the opening 42 in defined manner about a pivot setting axis B, whereas the other tool spindle 20' is mounted on a rear pivot yoke 44 which is articulated to the tool carriage 32 to be pivotable behind the front pivot yoke 43 in defined manner about the other pivot setting axis B', in particular again with respect to both sides of the opening 42. The corresponding carriage-side or yoke-side bearing points present on either side of the opening 42 cannot be seen in the figures. With respect to the height of the bearing points of the tool carriage 32 it is to be mentioned that the two pivot setting axes B, B' lie in a notional plane extending along the linear axis X or parallel thereto.

A further linear drive 45 is provided for drive of the pivot yokes 43, 44, i.e. for defined pivotation of the two tool spindles 20, 20' in common about the pivot setting axes B, B'. The linear drive 45 is articulated by one end thereof to the front pivot yoke 43 at a spacing from the corresponding pivot setting axis B and by the other end thereof to the tool carriage 32. More precisely, in the illustrated embodiment the linear drive 45 is a proprietary so-called "electric cylinder", with an actuating rod 46 which can be moved in or out by way of a rotary drive 47 and a transmission 48 when appropriate application of current to the rotary drive 47 takes place. If the rotary drive 47 is not current-conducting, self-locking is present in the transmission 48, i.e. the actuating rod 46 remains in its respective moved-out setting in the case of external forces which are not excessive; an integrated measuring system can report back the respective position of the actuating rod 46. This linear drive 45 is pivotably mounted at the drive-side end thereof on a mounting fork 49 mounted on the tool carriage 32, whereas at the other end of the linear drive 45 the actuating rod 46 pivotably engages a fork-shaped pivot arm 50 attached to the front pivot yoke 43. In order to transmit the thus-produced pivot movement from the front pivot yoke 43 to the rear pivot yoke 44 the two pivot yokes 43, 44 are connected in drive by way of a coupling rod 51 which is spaced from the pivot setting axes B, B', in particular is articulated above the pivot setting axes B, B' by one end thereof to the front pivot yoke 43 (bearing point 52 in FIGS. 2 and 4) and by the other end thereof to the rear pivot yoke 44 (bearing point 53 in FIGS. 2 and 4).

To that extent it is apparent that in the case of the chain of articulation with above-described configuration a defined axial movement out or movement in of the actuating rod 46 of the linear drive 45 has the consequence that the pivot yokes 43, 44 are pivoted in defined manner about the pivot setting axes B, B', whereby the tool spindles 20, 20' arranged centrally in the respective pivot yoke 43 or 44 are pivoted in always parallel orientation with respect to one another.

Further details with respect to possible tool spindles 20, 20' can be inferred from the documents U.S. Publication No. 2017/0246720 and DE 10 2016 004 328 A1, which are both hereby incorporated by reference with regard to the construction and function of the tool spindles 20, 20'. It may be recorded at this point merely that the spindle shafts (concealed in the figures by the bellows 21, 21'), which carry the tool mounts 13, 13', of the tool spindles 20, 20' are drivable at a given time by electric motors 54, 54', which are flange-mounted on the pivot yokes 43, 44, independently of one another for rotation—controllably in rotational speed and rotational direction—about the tool rotational axes A, A' and/or adjustable (adjustment axes Z, Z') independently of one another along the tool rotational axes A, A', in a given case in highly sensitive manner. In that case, the moved-in position of the respective spindle shaft and thus the upper position of the corresponding polishing tool 15, 15' can be recognized by means of a magnetic sensor 55, 55'.

Wth regard to, finally, the polishing tools 15, 15' held at the tool mounts 13, 13', mention is made at this point to document U.S. Publication No. 2017/0246729, which is hereby incorporated by reference with respect to construction and function of the polishing tools 15, 15'.

The different polishing processes performable with the afore-described kinematics of the device 10 are familiar to the expert and therefore shall not be described in more detail at this point, in which processes a liquid polishing medium is in fact fed to the engagement point between tool and workpiece by way of polishing medium nozzles 56 provided at the workpiece spindle 19 (see FIGS. 3 and 4, in which such a nozzle is by way of example representative of a plurality of nozzles distributed at the circumference of the workpiece spindle 19).

The construction and functioning of the sensor equipment 17 with the sensor arrangements 18, 18' thereof shall now be further explained on the basis of particularly FIGS. 5 to 17. As in the first instance can be best inferred from FIGS. 9 to 12, the sensor equipment 17 comprises a substantially block-shaped base frame 57 as a mechanical base. According to FIGS. 2 and 3 the base frame 57 of the sensor equipment 17 is secured to a free limb end of a holding frame 58, which is angular as seen in side view. In that case, the base frame 57 rests by its substantially horizontally extending lower limb on the equally horizontally extending lower limb of the holding frame 58. The other, substantially vertically extending limb of the holding frame 58 is directly mounted on the supporting frame 22 of the device 10, which surrounds the work chamber 11, whereby the base frame 57 of the sensor equipment 17 is mounted in fixed location. As a result, there is a fixed positional relationship of the sensor equipment 17 to the moved components (tool carriage 32, pivot yokes 43, 44, tool spindles 20, 20' with tool mounts 13, 13') of the device 10, which are similarly mounted at or on the frame 22. Fastening screws, which for simplification of the illustration are not shown in the figures, are provided for firm connection of the base frame 57 of the sensor equipment 17, the holding frame 58 and the frame 22 of the device 10.

In addition, the sensor equipment 17 has a sensor holder 59, which is illustrated in FIGS. 13 to 17 as an individual part. The sensor arrangements 18, 18' are fastened, in a manner still to be described, to or on the sensor holder 59. The sensor holder 59 is linearly displaceable with respect to the base frame 57 of the sensor equipment 17 in order to move the sensor arrangements 18, 18' from the protected rest position thereof to the detecting position and conversely. This linear movement of the sensor arrangements 18, 18' is indicated in the figures by the arrow S.

Figure 8:
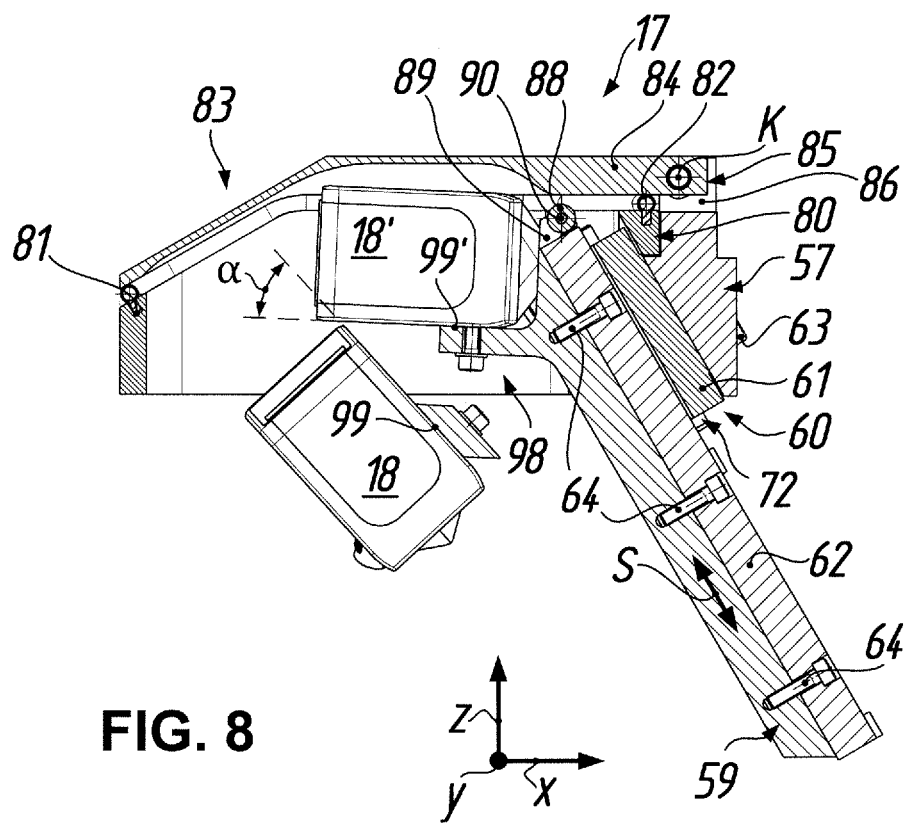
FIG. 8 shows a sectional view of the sensor equipment of the device according to FIG. 1 in correspondence with the section line VIII-VIII in FIG. 6, without the sheet metal cladding and holding frame, wherein, in particular, details with respect to a linear guide for the sensor holder can be inferred from the sectional view.
Figure 9:
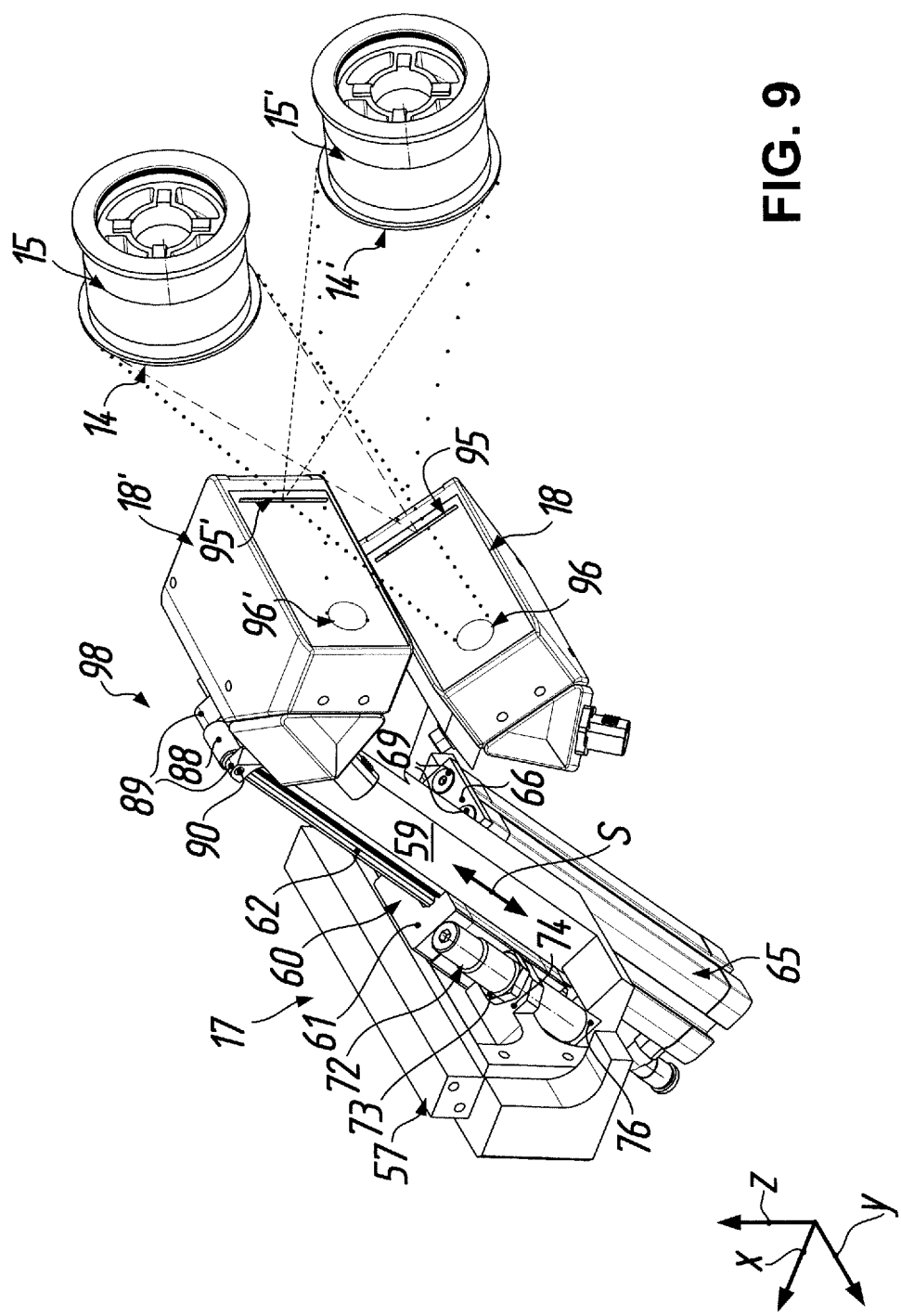
FIG. 9 shows a perspective view, similar to the viewing angle again of FIG. 4, of the sensor equipment illustrated separately from the device according to FIG. 1, in which by comparison with FIG. 5 the parts connected or co-operating with the flap have been omitted so as to show further details of the linear guide, wherein the sensor arrangements are disposed in the moved-out detecting position in which they are opposite the polishing tools indicated in FIG. 9 and positioned in correspondence with FIG. 3.
Figure 10:
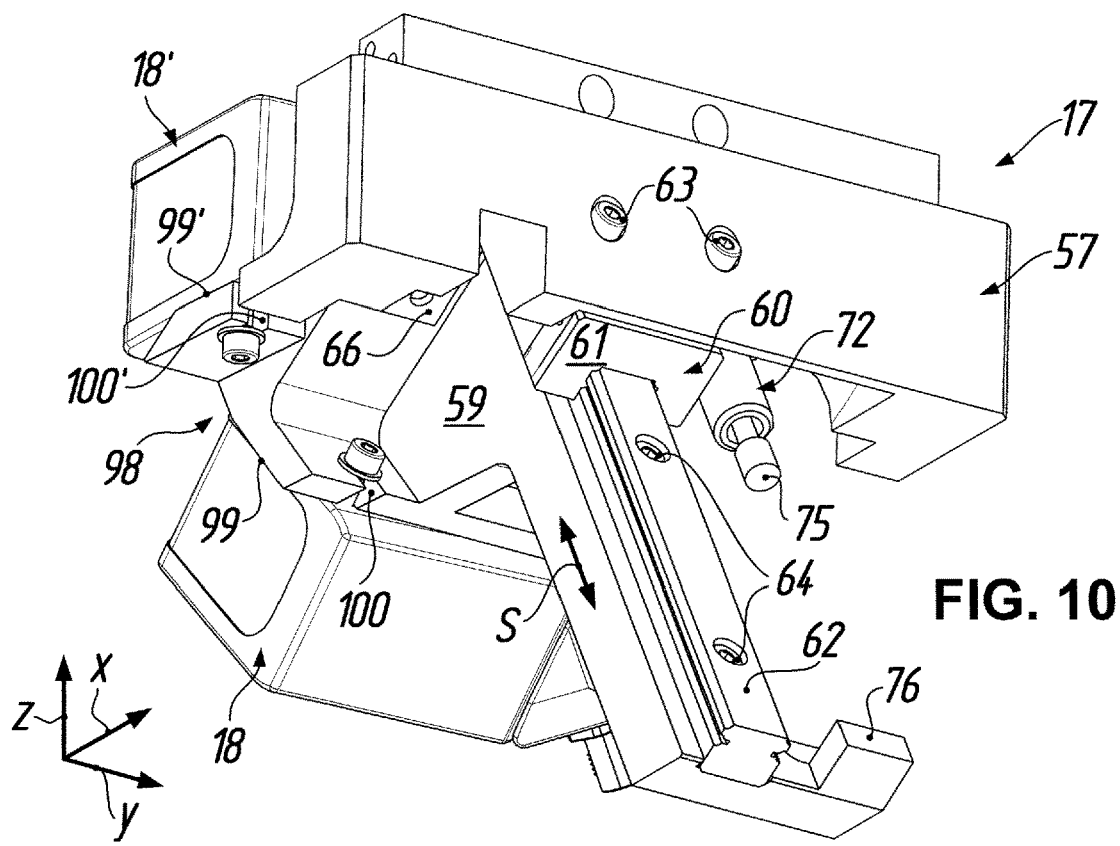
FIG. 10 shows a perspective view, which is similar to the viewing angle of FIG. 3, of the sensor equipment illustrated separately from the device according to FIG. 1, in which beyond the simplifications of FIG. 9 the linear drive has been omitted so as to show further details of the linear guide and of the fastening of the sensor arrangements to the sensor holder, the sensor arrangements being disposed in the moved-in rest position.

In order to guide the sensor holder 59 relative to the base frame 57 in the case of the linear movement S a proprietary linear guide 60 is provided, which can be best seen in FIGS. 8 to 10 and 12. The linear guide 60 comprises a guide carriage 61, which is mounted in a substantially central cut-out of the base frame 57 and in which a guide rail 62 runs. The guide rail 62 is mounted on the sensor holder 59. Fastening screws 63 and 64 as shown in, in particular, FIGS. 8 and 10 are provided for mounting the guide carriage 61 on the base frame 57 and the guide rail 62 on the sensor holder 59.

According to, in particular, FIGS. 8 to 10 the cut-out for reception of the guide carriage 61 in the base frame 57 extends at an inclination with respect to the height direction z of the device 10, so that in the case of outward movement, which is guided by way of the linear guide 60, of the sensor arrangements 18, 18' fastened to the sensor holder 59 (linear movement S) the sensor arrangements 18, 18' move not only in the height direction z, but at the same time also oppositely to the length direction x, i.e. at an inclination to the opening 16 to the work chamber 11, so that the sensor arrangements 18, 18' moving out of the rest position thereof tend to approach the work regions 14, 14', which are to be detected, of the polishing tools 15, 15' and these are approached to a maximum extent on the sensor side in the detecting position of the sensor arrangements 18, 18'.

Figure 12:
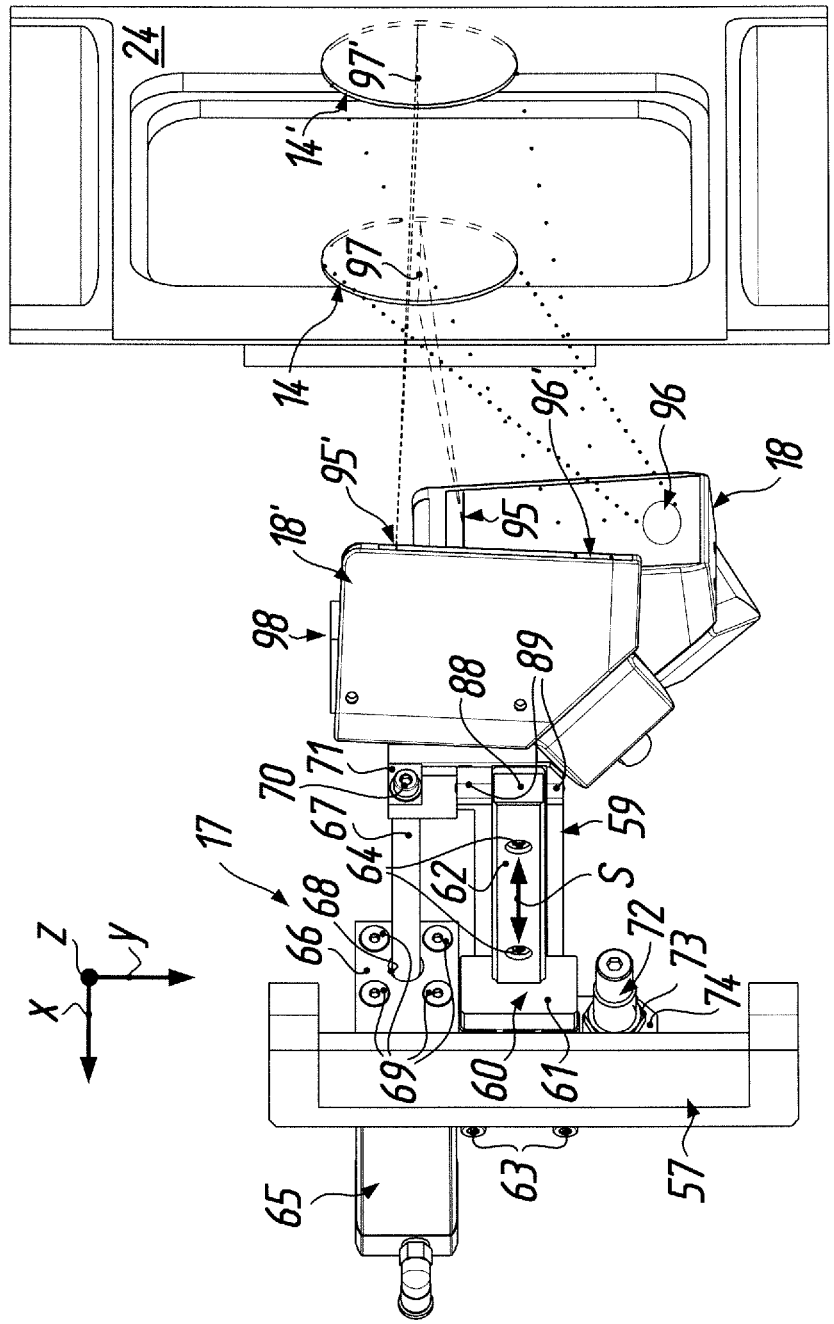
FIG. 12 shows a plan view of the sensor equipment, which is illustrated separately from the device according to FIG. 1, from above in FIGS. 9 and 11 and in the detecting state, together with the simplifications of FIGS. 9 and 11, as a further illustration of how the sensor arrangements detect, via the sliding door which bounds the opening to the work chamber, the polishing tools positioned in correspondence with FIG. 3, of which merely polishing medium carriers are indicated in FIG. 12.
Figure 13:
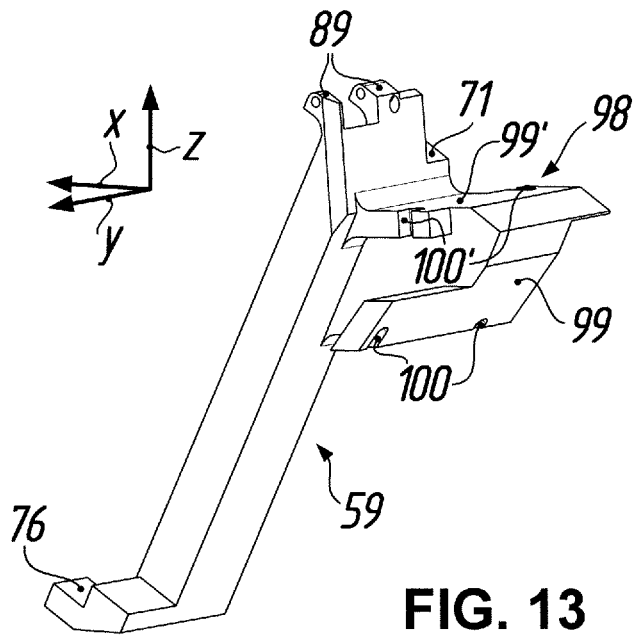
FIG. 13 shows a perspective view of the sensor holder, which is illustrated separately from the sensor equipment according to FIGS. 5 and 9, with a view of mounting surfaces for the sensor arrangements obliquely from above and back right.
Figure 14:
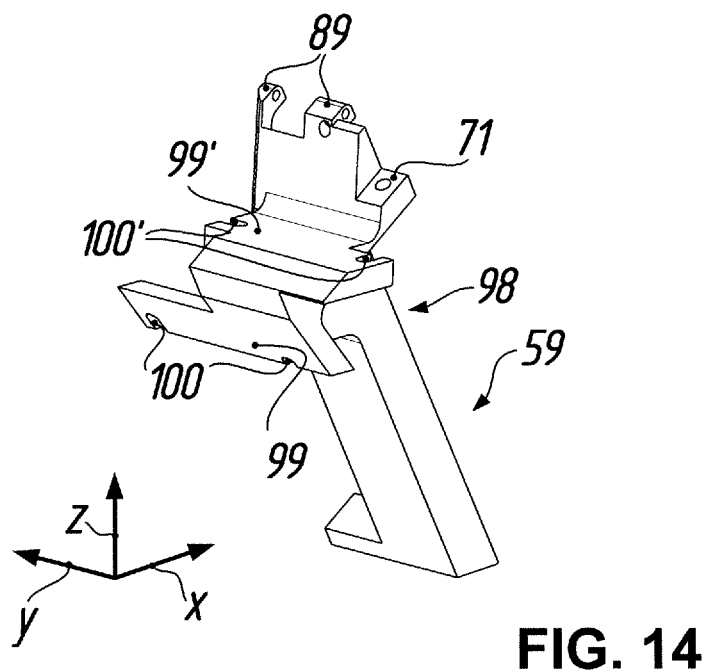
FIG. 14 shows a perspective view of the sensor holder, which is illustrated separately from the sensor equipment in correspondence with FIG. 13, with a view of the mounting surfaces for the sensor arrangements obliquely from above and back left.

FIGS. 5, 7, 9 and 12 further show, in particular, that the sensor equipment 17 comprises a linear drive in the form of a pneumatic cylinder 65 which is in drive connection with the sensor holder 59 and which is not illustrated in FIG. 10, so as to allow a view onto the sensor holder 59. In the illustrated embodiment the pneumatic cylinder 65 is mounted between the base frame 57 and the sensor holder 59 to be effective in terms of actuation. More precisely, the pneumatic cylinder 65 in accordance with the sectional view according to FIG. 7 and the plan view according to FIG. 12 is flange-mounted on an associated fastening flange 66 of the base frame 57 so that a piston rod 67 of the pneumatic cylinder 65 extends through a central opening 68 in the fastening flange 66. Flange screws for fastening the pneumatic cylinder 65 to the fastening flange 66 are denoted in FIGS. 6, 9 and 12 by the reference numeral 69. For the drive connection with the sensor holder 59, the free end of the piston rod 67 is secured to an entrainer section 71 of the sensor holder 59 by means of a fastening screw 70, as can be best seen in FIGS. 7 and 12.

Figure 7:
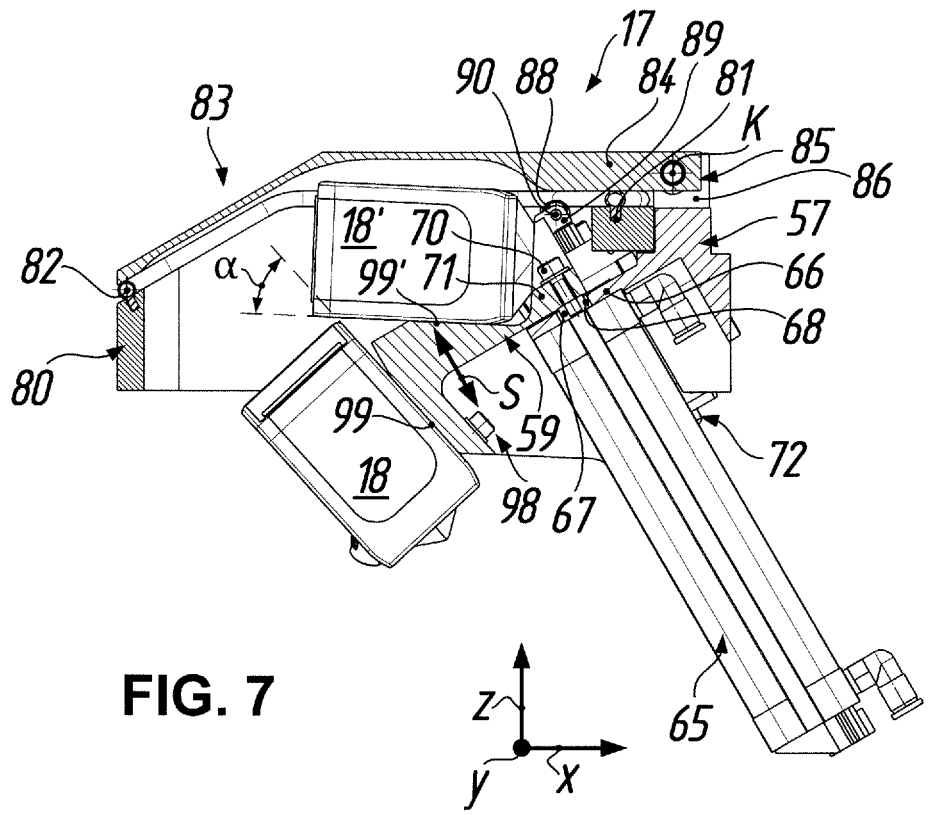
FIG. 7 shows a sectional view of the sensor equipment of the device according to FIG. 1 in correspondence with the section line VII-VII in FIG. 6, without the sheet-metal cladding and holding frame, wherein the sectional view shows, in particular, details with respect to a linear drive for a sensor holder which carries the sensor arrangements of the sensor equipment.
Figure 11:
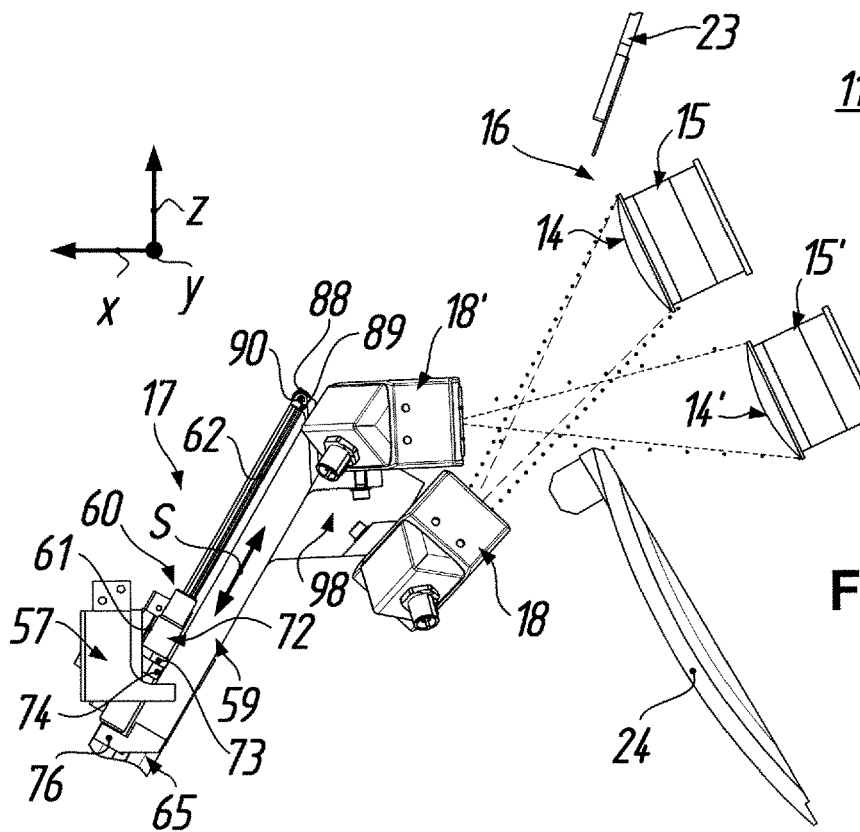
FIG. 11 shows a side view, which is broken away in the region of the linear drive, of the sensor equipment, which is illustrated separately from the device according to FIG. 1, from the right in FIG. 3 in the detecting state and with the simplifications of FIG. 9, wherein as parts of the device of FIG. 1—which upwardly and downwardly bound the opening of the work chamber in the open state—a sealing plate mounted on the work chamber cover and the sliding door are indicated so as to illustrate how the sensor arrangements detect, via the opening, the polishing tools indicated in FIG. 11 similarly to in FIG. 9 and positioned in correspondence with FIG. 3.

As far as the end positions of the linear movement S of the sensor arrangements 18, 18' are concerned, the rest position of the sensor arrangements 18, 18' is defined by the fact that the entrainer section 71 of the sensor holder 59 in the case of an inward movement S of the sensor arrangements 18, 18' comes into contact from above with the fastening flange 66 for the pneumatic cylinder 65. This state is illustrated in FIG. 7. The moved-out detecting position of the sensor arrangements 18, 18', on the other hand, is fixed by a proprietary shock absorber 72. The shock absorber 72 is fastened by means of a union nut 73 to a shock absorber flange 74 of the base frame 57, as shown in FIGS. 9, 11 and 12, so that a shock absorber plunger 75 points downwardly on the side of the shock absorber flange 74 remote from the union nut 73, as can be seen in FIG. 10. In addition, the sensor holder 59 is provided with an abutment section 76 which when outward movement of the sensor holder 59 takes place can come into contact with the shock absorber plunger 75. It will be evident that the shock absorber 72 is thus arranged to be effective in terms of actuation between the base frame 57 and the sensor holder 59, in which case it limits the linear displacement S of the sensor holder 59 relative to the base frame 57 and thus defines the detecting position of the sensor arrangements 18, 18'.

Figure 6:
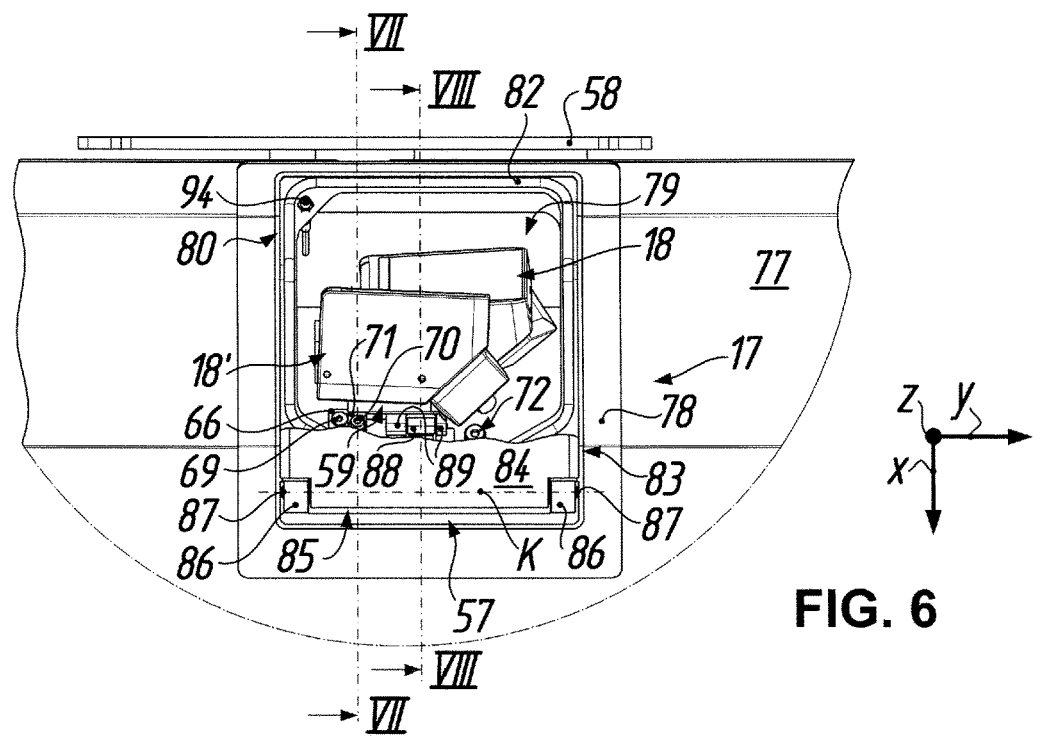
FIG. 6 shows a plan view, which is broken away laterally and downwardly, of the sensor equipment, which is recessed into the sheet-metal cladding and which is mountable on the device of FIG. 1 by way of a holding frame, but otherwise illustrated separately from the device according to FIG. 1, from above in FIG. 1, which is shown broken away in the region of the closed flap so as to allow a view of the sensor arrangements thereunder moved into the rest position thereof.
Figure 5:
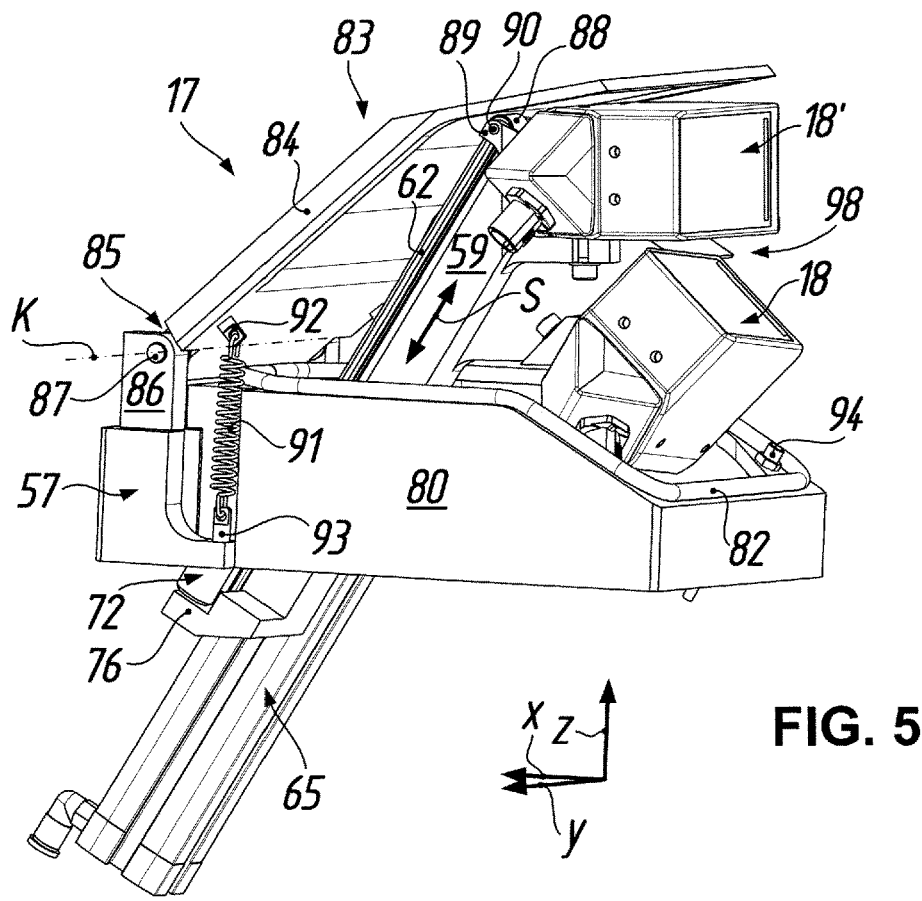
FIG. 5 shows a perspective view, which is similar to the viewing angle of FIG. 4, of the sensor equipment illustrated separately from the device according to FIG. 1, wherein the sensor arrangements of the sensor equipment are disposed below a pivoted-up flap of the sensor equipment in a moved-out detecting position.

As FIGS. 1 and 6 also show, the sensor equipment 17 is seated in an opening of a sheet-metal cover 77—which is illustrated here broken away—in front of the opening 16, which is closed by means of the sliding door 24, to the work chamber 11, wherein an installation frame 78 seals relative to the sheet-metal cover 77. A receiving chamber 79 formed in or under the sheet-metal cover 77 is bounded in an upper region with respect to the sides of the base frame 57 and a sealing frame 80, which is suitably fastened thereto and substantially rectangular as seen in plan view. The sealing frame 80 in the illustrated embodiment according to, in particular, FIGS. 7 and 8 is provided at its upper side with an encircling groove 81, in which a seal 82—here in the form of an elastomeric sealing profile member—is incorporated, which seal surrounds the receiving chamber 79 as shown in FIGS. 5 and 6.

As can be further inferred from FIGS. 1, 2, 7 and 8, the sensor arrangements 18, 18' in their protected rest position are covered by means of a cover 83 of the sensor equipment 17 to be sealed relative to the environment. The cover 83 of the sensor equipment 17 comprises a flap 84, which is mounted at an edge 85 and, in particular, at an edge 85 remote from the opening 16 to the work chamber 11 so that the flap 84 is pivotable about a pivot axis K from a closed setting associated with the rest position of the sensor arrangements 18, 18' (cf. FIGS. 1, 2, 6 (illustrated broken away), 7 and 8) to an open setting associated with the detecting position of the sensor arrangements 18, 18' (see FIGS. 3 to 5) and conversely. In that regard, the flap 84 in its closed setting according to FIGS. 7 and 8 co-operates with the seal 82 which is mounted in fixed position and encircles the sensor equipment 17, so as to seal off the sensor arrangement 17 relative to the environment.

For the pivotable articulation of the flap 84, bearing blocks 86 by which the flap 84 is connected by way of bearing pins 87 to be pivotable with respect to the base frame 57 about the pivot axis K are fastened to the base frame 57 at the edge 85 on either side of the flap 84. In the illustrated embodiment the flap 84 does not have a handle or even an individual drive, but instead is pivotable about the pivot axis K as a function of displacement of the sensor holder 59 relative to the base frame 57. In that case, the sensor holder 59 engages the flap 84 by way of a rotatably mounted roller body 88, as especially FIGS. 5, 7 and 8 show. More precisely, the sensor holder 59 is provided in an upper region with two bearing eyes 89, between which the roller body 88, in the form of a roller, is mounted by means of an axle 90. It is evident that the roller body 88 in the case of outward movement of the sensor holder 59 rolls along a lower side of the flap 84 and in that case pivots up the flap 84 in low-wear manner about the pivot axis K.

In order to achieve a closed setting, which is as tight as possible, of the flap 84 and to assist a closing movement, which easily follows the inward movement of the sensor holder 59, of the flap 84 there is spring-biasing of the flap 84 into the closed setting. In the illustrated embodiment this is realized with the help of two screw tension springs 91. On the flap side, the screw tension springs 91 are each hung on either side of the flap 84 by a respective end in associated eyes 92 at the underside of the flap 84 near the bearing blocks 86. On the side of the base frame 57, on the other hand, the screw tension springs 91 engage by the respective other end thereof in associated eyes 93 fastened to the base frame 57, as can be seen in, in particular, FIGS. 3 and 5.

Wth regard to the flap 84 it is also to be noted that the flap 84 co-operates with a preferably inductively operating proximity switch 94 which is mounted in a fixed location and which is adapted to detect the closed setting of the flap 84 and thus the rest position of the sensor arrangements 18, 18'. For that purpose, the flap 84 is of metallic construction at least in a part region. A logical linking is that if the flap 84 is in its closed setting the sensor holder 59 has to be moved in. It is thus ensured that the sensor arrangements 18, 18' on detection of this switch signal are actually disposed in their protected rest position below the flap 84 and do not, for example, rise above the flap 84. FIGS. 5 and 6 show this proximity switch 94, which is mounted in a corner of the sealing frame 80. The moved-out detecting position of the sensor arrangements 18, 18' can also be detected and, in particular, by way of an appropriate sensor mounted at a suitable position of the pneumatic cylinder 65, which is not, however, shown in the figures.

As already discussed above, the sensor equipment 17 in the illustrated embodiment comprises two sensor arrangements 18, 18', which are each associated with a respective tool mount 13, 13' in the work chamber 11. In that regard, the sensor arrangements 18, 18' are of identical construction and, in particular, each sensor arrangement 18, 18' comprises a laser 95, 95' and a light-section sensor 96, 96', as schematically shown in FIGS. 9 and 12. As further indicated in FIGS. 9, 11 and 12 by dashed lines for a laser light band, which is emitted by the respective laser 95, 95', and by dotted lines for a detecting region of the respective light-section sensor 96, 96' a laser line 97, 97' able to be imaged by the corresponding laser 95, 95' on the processing region 14, 14' of the associated tool 15, 15' is detectable by use of the respective light-section sensor 96, 96' triangulation method, from which height and width data can be obtained. Sensor arrangements of that kind are commercially available from, for example, the company Pepperl+Fuchs GmbH, Mannheim, Germany.

A contour on the respective processing region 14, 14' of the polishing tool 15, 15' is detected by this procedure. If comparison of the detected actual contour, here from the processing region 14, 14' of an already used polishing tool 15, 15', with a reference or target contour, here from the processing region 14, 14' of a previously detected and read, new polishing tool 15, 15', yields a deviation it is to be decided whether the deviation still lies within permissible limits, i.e. the tolerance. If the deviation still lies within the tolerance, then the polishing tool 15, 15' can still be used, but otherwise if the deviation is beyond a predetermined limit the polishing tool 15, 15' is to be replaced.

In the present case, a structural feature is also that as a consequence of (1) the serial arrangement of the polishing tools 15, 15' to be checked, (2) the desire in terms of measurement to keep the spacings between the sensor arrangements 18, 18' and the respective processing regions 14, 14', which are to be detected, at the polishing tools 15, 15' the same as far as possible so as to achieve comparable detection results, (3) the requirement with respect to measuring that the emitted laser light bands should not intersect, and (4) the presence of the parts, which bound the opening 16 to the work chamber 11, of the device 10 (sliding door 24 downwardly, seal at the upper work chamber cover 23 upwardly), as indicated in FIG. 11, the "look-through area", which is effectively usable for recognition of wear, of the opening 16 is actually only very small.

Figure 15:
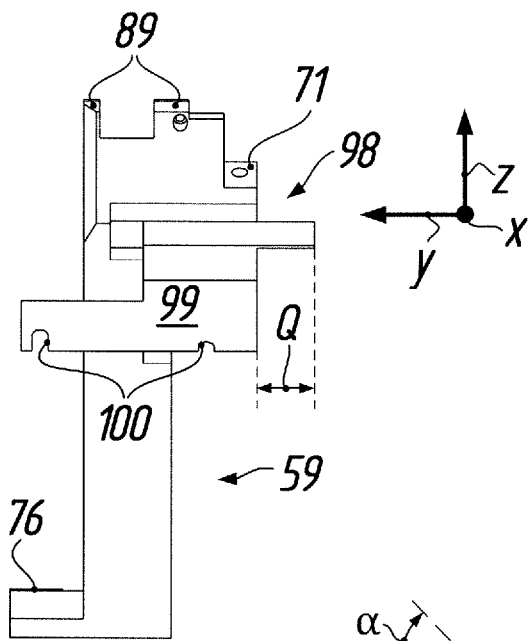
FIG. 15 shows a back view of the sensor holder according to FIGS. 13 and 14.
Figure 16:
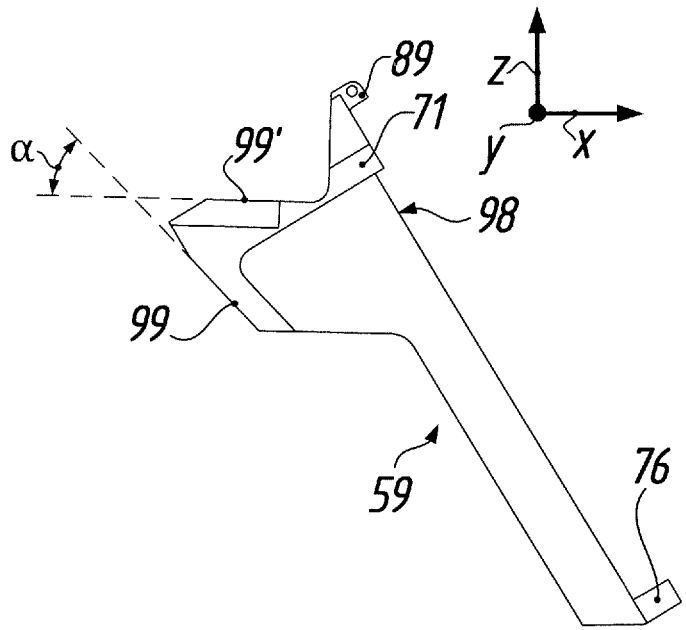
FIG. 16 shows a side view of the sensor holder according to FIGS. 13 and 14 from the right in FIG. 15.
Figure 17:
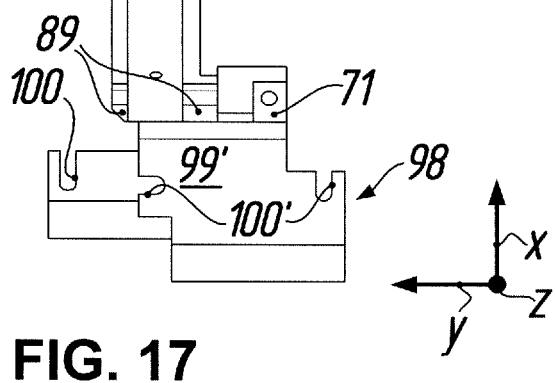
FIG. 17 shows a plan view of the sensor holder according to FIGS. 13 and 14 from above in FIG. 15.

In the present embodiment this aspect is ultimately addressed by the fact that the sensor holder 59 of the sensor equipment 17 has at a holder head 98 two mounting surfaces 99, 99' each fora respective one of the sensor arrangements 18, 18', which (1) in wedge-shaped arrangement include an acute angle α with one another, as indicated in FIGS. 7, 8 and 16, (2) with respect to a longitudinal axis of the sensor holder 59 have a transverse offset Q relative to one another, as illustrated in FIG. 15, and finally (3) are provided with oblong holes 100, 100', which here are laterally open and which allow mounting of the sensor arrangements 18, 18' turned relative to one another on the mounting surfaces 99, 99'. This enables a very close (screw) mounting, which satisfies the above requirements, of the sensor arrangements 18, 18' on the holder head 98, in which according to, for example, FIG. 9 the lower sensor arrangement 18 "looks" obliquely onto the upper polishing tool 15, whereas the upper sensor arrangement 18' obliquely "views" the lower polishing tool 15'.

The actual process of wear recognition can now take place as follows, wherein a detailed illustration of how the polishing tools 15, 15' reach the forwardly pivoted setting according to, for example, FIGS. 3 and 4 and the sensor equipment 17 transfers into the opened detecting state thereof in which its sensor arrangements 18, 18' are opposite the processing regions 14, 14' of the polishing tools 15, 15' via the opening 16 shall be dispensed with at this point because this is apparent to one ordinarily skilled in the art from the previous description.

After a tool change the new polishing tool 15, 15' initially has to have its parameters, i.e. dimensions determined or learned and the contour of the processing region 14, 14' has to be stored as a "target curve". This takes place at the 0° rotational position of the polishing tool 15, 15' (rotational axis A, A'). Since the polishing tool 15, 15' is rotationally symmetrical, it is assumed that a single learning process is sufficient as reference. Optionally, analogously to the measuring process which is described in the following, it can be learned in steps at several rotational positions. As an alternative, on the assumption of a high level of repetition accuracy in the production of the polishing tools 15, 15' it is also possible for a standard contour to be filed for each tool type, whereby the learning process after the tool change could be eliminated.

The contour ascertained in the learning process is used in all following measurements as a reference with which the measurement contours are compared.

If in the case of a measurement one or more defined quality thresholds are not met i.e. the deviation is beyond a predetermined amount, then the sensor equipment 17 delivers the measurement result "poor" for this measurement. In that case, each individual measurement detects only a section over the polishing tool 15, 15' at an axial position. In order to check the entire processing region 14, 14', the polishing tool 15, 15' rotates in settable defined steps (1°, 2°, 5°, 10°) about its rotational axis A or A'. A fresh measurement takes place after each step. Since an individual failure to meet one of the thresholds at one axial position does not necessarily require a tool change, a defined number of measurement results of "poor" is still accepted for assessment of the overall state. Depending on frequency and distribution of the "poor" results over the entire processing region 14, 14' it is ultimately decided whether the polishing tool 15, 15' is in fault-free, acceptable or poor state.

A device for processing of, in particular, spectacle lenses has a work chamber which is accessible from outside by way of a selectably closable opening and in which a workpiece mount and at least one tool mount are opposite one another and movable relative to one another so that a processing region of a tool held at the tool mount can be brought into processing engagement with a workpiece held at the workpiece mount and, in the processing engagement, can be guided over the workpiece. Provided for recognition of wear at the tool is sensor equipment with at least one contactlessly operating sensor arrangement which is movable outside the work chamber from a protected rest position to a detecting position and conversely. The sensor equipment in the detecting position of the sensor arrangement is adapted to detect, via the opened opening of the work chamber, at the processing region of the tool held at the tool mount an unacceptable deviation beyond a predetermined amount of the processing region from a desired geometry.

Variations and modifications are possible without departing from the scope and spirit of the present invention as defined by the appended claims.

We claim:

1. A device for processing optical workpieces, comprising a work chamber, which is accessible from outside by way of a selectably closable opening and in which a workpiece mount and at least one tool mount are arranged opposite one another and movable relative to one another so that a processing region of a tool held at a first tool mount of the at least one tool mounts can be brought into processing engagement with a workpiece held at the workpiece mount and can be guided over the workpiece in the processing engagement, wherein for recognition of wear at the tool a sensor equipment with at least one contactlessly operating sensor arrangement is provided outside the work chamber and arranged to be movable from a protected rest position to a detecting position and conversely, and the sensor equipment is constructed to detect by the sensor arrangement in the detecting position via the opened opening of the work chamber at the processing region of the tool held at the first tool mount an unacceptable deviation of the processing region from a desired geometry beyond a predetermined amount.

2. A device for processing optical workpieces according to claim 1, wherein the sensor equipment comprises a base frame which is mounted in fixed position, and a sensor holder on which the at least one sensor arrangement is mounted, said sensor holder being linearly displaceable with respect to said base frame so as to move the sensor arrangement from the protected rest position to the detecting position and conversely.

3. A device for processing optical workpieces according to claim 2, further comprising a linear guide which has a guide carriage attached to the base frame and a guide rail mounted on the sensor holder, wherein the sensor holder is guided relative to the base frame by the linear guide.

4. A device for processing optical workpieces, according to claim 2, wherein a shock absorber is positioned between the base frame and the sensor holder, which shock absorber limits the linear displacement of the sensor holder relative to the base frame and thus defines the detecting position of the at least one sensor arrangement.

5. A device for processing optical workpieces according to claim 2, wherein the sensor equipment comprises a linear drive drivingly connected with the sensor holder.

6. A device for processing optical workpieces according to claim 5, wherein the linear drive is a pneumatic cylinder mounted to be effective in terms of actuation between the base frame and the sensor holder.

7. A device for processing optical workpieces according to claim 2, wherein the sensor equipment comprises a cover, and wherein the at least one sensor arrangement is covered by the cover in the protected rest position of the sensor arrangement so as to be sealed relative to the environment.

8. A device for processing optical workpieces according to claim 7, wherein the cover of the sensor equipment comprises a flap which is mounted at an edge so that the flap is pivotable from a closed setting associated with the rest position of the at least one sensor arrangement to an open setting associated with the detecting position of the at least one sensor arrangement and conversely.

9. A device for processing optical workpieces according to claim 8, further comprising a seal; which is mounted in fixed position and encircles the sensor equipment so as to seal the sensor equipment relative to the environment, wherein the flap in its closed setting cooperates with the seal.

10. A device for processing optical workpieces according to claim 8, further comprising a spring, wherein the flap is biased by said spring into the closed setting.

11. A device for processing optical workpieces according to claim 8, further comprising a proximity switch, wherein the flap co-operates with said proximity switch which is mounted in fixed position and which is adapted to detect the closed setting of the flap and thereby the rest position of the at least one sensor arrangement.

12. A device for processing optical workpieces according to claim 8, wherein the flap is pivotable relative to the base frame in dependence on a displacement of the sensor holder.

13. A device for processing optical workpieces according to claim 12, wherein the sensor holder engages the flap by way of a rotatably mounted roller body.

14. A device for processing optical workpieces according to claim 1, further comprising a supporting frame surrounding the work chamber, wherein the sensor equipment is mounted by way of a holding frame directly on the supporting frame of the device.

15. A device for processing optical workpieces according to claim 1, wherein the at least one tool mount further comprises a second tool mount which is arranged opposite the workpiece mount and which is movable in the work chamber relative to the workpiece mount so that a processing region of a further tool held at the second tool mount can be brought into processing engagement with a workpiece held at the workpiece mount and can be guided over the workpiece in processing engagement, wherein the second tool mount with the further tool held thereat is movable in parallel arrangement to and in common with the first tool mount with respect to the sensor equipment into a checking position in which by means of the sensor equipment the recognition of wear can be carried out via the opened opening of the work chamber, and wherein said at least one sensor arrangement of the sensor equipment are two sensor arrangements each associated with the respective first or second tool mounts.

16. A device for processing optical workpieces according to claim 15, wherein the two sensor arrangements are of identical construction.

17. A device for processing optical workpieces according to claim 15, wherein the sensor holder of the sensor equipment comprises a holder head having two mounting surfaces each for a respective one of the two sensor arrangements, said mounting surfaces being arranged in a wedge-shaped manner, including an acute angle ($\alpha$) with one another, having a transverse offset (Q) from one another with respect to a longitudinal axis of the sensor holder, and being provided with oblong holes which permit mounting two of the sensor arrangements turned relative to one another on the mounting surfaces.

18. A device for processing optical workpieces according to claim 15, wherein each of the two sensor arrangements comprises a laser and a light-section sensor, and wherein by the light-section sensor a laser line projectable by the laser on the processing region of the associated tool is detectable by way of a triangulation method.

19. A device for processing optical workpieces according to claim 1, wherein the at least one sensor arrangement comprises a laser and a light-section sensor, and wherein a laser line projectable by the laser on the processing region of the associated tool is detectable by way of a triangulation method.

* * * * *

UNITED STATES PATENT AND TRADEMARK OFFICE
CERTIFICATE OF CORRECTION

Page 1 of 1

PATENT NO. : 11,633,827 B2
APPLICATION NO. : 16/182797
DATED : April 25, 2023
INVENTOR(S) : Viktor Bernhardt et al.

It is certified that error appears in the above-identified patent and that said Letters Patent is hereby corrected as shown below:

On the Title Page

Item [72], Inventors, insert inventors:
--Holger Schäfer, Weilmünster, (DE);
Steffen Wallendorf, Wetzlar-Dutenhofen, (DE)--

Signed and Sealed this
Twenty-ninth Day of April, 2025

Coke Morgan Stewart
*Acting Director of the United States Patent and Trademark Office*